3,296,183
METHOD OF HEAT TREATING ETHYLENE/ ALPHA - MONOOLEFIN/NONCONJUGATED DIENE POLYMERS
Melvin Albert Schoenbeck, Wilmington, Del., assignor to E. I. du Pont de Nemours and Company, Wilmington, Del., a corporation of Delaware
No Drawing. Filed Mar. 8, 1962, Ser. No. 178,258
4 Claims. (Cl. 260—41)

This invention is directed to an improved process for curing chain-saturated sulphur-curable ethylene hydrocarbon copolymers as hereinafter described and claimed.

Sulphur-curable ethylene hydrocarbon copolymers are acquiring increasing importance today in the manufacture of a wide variety of useful products. For some applications, such as shoe soles and heels, it is desirable that a large proportion of a reinforcing clay filler be present along with the ethylene copolymer. Although such compositions can be cured by a wide variety of sulphur-curing systems, the vulcanizates obtained require a higher modulus, more resilience, better abrasion resistance, and lower compression sets for some applications. It is known that this result can be attained, to some extent, if these ethylene copolymers are heat-treated prior to incorporation of the curing agents. It has been found that this heat-treatment is made more effective if certain promoters are present during the heat-treatment such as the dinitroso, dioxime, and aromatic quinoid compounds known to be heat-treatment promoters for butyl rubber containing carbon black. U.S. Patent 2,822,342 describes their application in butyl. Unfortunately, ethylene copolymer compounds containing high loadings of clay have short scorch time. Heat treating with said promoters provides only slight improvement in scorch resistance making processing difficult. In addition, many of the conventional heat-treating promoters are not entirely satisfactory because they impart a dark color when used in making light-colored stocks.

It is, therefore, an object of the present invention to provide a novel improved process for curing hydrocarbon copolymers. It is a further object to provide an improved and novel process for sulphur-curing ethylene hydrocarbon copolymer stocks containing reinforcing clay. It is a still further object to provide a significantly improved and novel process for heat-treating clay loaded sulphur-curable ethylene/nonconjugated hydrocarbon diene copolymers, which process makes possible a non-scorchy cure giving vulcanizates displaying improved modulus, resilience, abrasion resistance, and compression set with reduced discoloration.

These and other objects will become apparent in the following description and claims.

More specifically, the present invention is directed to a process for heat-treating a normally solid ethylene/ $CH_2$=CH-($C_{1-16}$alkyl)/nonconjugated hydrocarbon diene copolymer before curing, which process comprises masticating at 275–500° F. a mixture comprising by weight 100 parts of said copolymer, 20–300 parts of clay, and at least 1 part of a promoter compound having at least 6% chemically incorporated chlorine by weight, said promoter compound being selected from the class consisting of chlorinated saturated aliphatic hydrocarbon polymers, sulfochlorinated saturated aliphatic hydrocarbon polymers, and mixtures of said polymers; with the proviso that there shall be at least 0.3 part of said chlorine present.

In operating the novel process of the present invention, the copolymer is mixed with clay and a promoter compound prior to the heat-treatment. Although the order of addition is not important, it is essential that both the clay and the promoter be present. It has been observed that the heat treatment of clay-loaded copolymer in the *absence of a promoter* improves vulcanizate properties to some extent. However, it is significantly shown in Example 5, which follows, that the presence of the promoter in clay loaded stocks permits far easier processability because of the much longer scorch-free time; furthermore, the vulcanizates which result display much improved modulus, resilience, abrasion resistance, and resistance to compression set. This is particularly surprising because it has been found that when the copolymer is heat treated with the promoter in the absence of clay (which is added afterward prior to cure), the clay reinforced vulcanizate finally obtained is not much better than the conventional clay-loaded vulcanizates which have not been made from heat treated stock.

In operating the process of the present invention, a wide variety of sulfochlorinated polymers can be used as promoters. Representative sulfochlorinated polymers contain about 6–48% by weight chlorine and about 0.25–3% sulphur by weight. They are prepared by reacting saturated hydrocarbon (or chloro-substituted hydrocarbon) polymers with a mixture of chlorine and sulphur dioxide (see U.S. Patent 2,212,786).

Representative promoters of this type include: sulfochlorinated polymers containing 25–37% chlorine and 0.4–3% sulfur made from polyethylene, ethylene/vinyl chloride interpolymers, or ethylene/vinylidene chloride interpolymers (U.S. Patent 2,586,363); sulfochlorinated polymers containing 20–45% chlorine and 0.25–3% sulfur made from hydrogenated homopolymers of conjugated hydrocarbon dienes, hydrogenated interpolymers of at least two conjugated hydrocarbon dienes, hydrogenated interpolymers of conjugated hydrocarbon dienes and chloroprene, or hydrogenated interpolymers of hydrocarbon dienes and hydrocarbon (and chlorohydrocarbon) monoolefins (U.S. Patent 2,646,422); sulfochlorinated interpolymers of at least two $C_2$–$C_6$ alpha olefins, containing 6–35% chlorine and 0.5–3% sulfur (U.S. Patent 2,879,261); sulfochlorinated polyethylene having a chlorine content of from 38–48% and a sulfur content of 0.1–3%, the polyethylene prior to sulfochlorination having a density of from 0.935 to about 0.960, a melt index of from 0.2 to about 200, and a solubility in $CCl_4$ of at least 1% by weight (U.S. Patent 2,982,759). Hydrogenated natural rubber and polyisobutylene can also be sulfochlorinated for use in this invention. The preferred promoters are sulfochlorinated (also termed "chlorosulfonated") polyethylenes having about 30–48% chlorine and about 0.9 to 1.6% sulfur by weight.

A wide variety of chlorinated polyolefins can be used as promoters in the process of the present invention. Representative examples are described in the following patents: U.S. Patent 2,964,509; U.S. Patent 2,748,105; U.S. Patent 2,398,803; U.S. Patent 2,183,556; U.S. Patent 2,503,252; British Patent 623,705; and British Patent 481,515. Chlorinated paraffins and chlorinated polyethylenes suitable for use are described in U.S. Patent 2,571,901.

In general, there should be at least 0.3 part of chemically combined chlorine in the promoter for every 100 parts by weight of said ethylene hydrocarbon copolymer. The minimum concentration of a representative preferred promoter, sulfochlorinated polyethylene having 30% chlorine and 1.5% sulfur by weight, is thus about 1 part per 100 parts by weight of copolymer; in general, there should be in the neighborhood of 1 part of chemically combined chlorine in the promoter for every 100 parts by weight of copolymer. When greater amounts are employed, the additional improvement observed is small, being largely a higher modulus and a lower compression set. When smaller amounts are employed a less satisfactory result is obtained. For example, when only one part of the representative preferred promoter is employed, there is essentially no improvement in the Mooney scorch although there is a distinct improvement in the resistance to compression set and a slight improvement in the modulus and Yerzley resilience. High promoter concentrations (e.g. about 5 parts of the representative preferred promoter) can be employed, but are less economically attractive and are generally unnecessary.

Any clay which is conventionally used for reinforcing elastomers can be employed in the present invention. In general, these clays have particle sizes in the range of 2 microns. The finer the particle size, the better the filler responds in the improved process of the present invention. It is not critical whether these clays are "residual" or "sedimentary" in origin; they can be produced by any conventional process such as the dry process (air flotation) or the wet process (classification in a water suspension) and they include the calcined clays made by firing the kaolin clays. The kaoline clays are the clay minerals belonging to the kaolin group and have a stable non-expanding crystal lattice in which one gibbsite sheet is condensed with one silica sheet. Representative materials include kaolinite, the most important one, nacrite, dikite, and halloysite. Kaolinite has the chemical formula $$Al_2O_3 \cdot 2SiO_2 \cdot 2H_2O$$

It is to be understood that they generally also contain some compounds of iron, titanium, calcium, magnesium, potassium, sodium and occasionally manganese. These kaolin clays frequently occur as mixtures; minor proportions of hydrated aluminum silicate minerals other than kaolinite may be present in kaolinite clay. In general, the molar ratio of silica to alumina is in the neighborhood of 2:1, the value of kaolinite itself.

The principal physical characteristics of the clays which are preferred for use in the present invention are: (1) a specific gravity of about 2.60; (2) a 325-mesh screen residue below about 3.5%, preferably below about 0.35%; (3) a moisture (absorbed) content of about 0 to 1%; (4) a particle size distribution wherein at least about 55% by weight of the particles are two microns or less in diameter; (5) a pH (in water) of about 4.4 to 7.0, although specifically prepared and treated clays may show pH values of 8.0 or higher.

The following data illustrate the properties of representative kaolinite clays:

KAOLINITE CLAYS

| Type | Hard | Hard | Soft | Soft | Soft | Soft |
|---|---|---|---|---|---|---|
| Process | A.F.[1] | A.F. | A.F. | A.F. | A.F. | W.F.[2] |
| Specific Gravity | 2.60 | 2.60 | 2.60 | 2.60 | 2.60 | 2.60 |
| 325 Mesh Residue, Percent | 0.17 | 0.03 | 0.30 | 0.05 | 0.30 | 0.02 |
| Max. Moisture, Percent | 1.0 | 1.0 | 1.0 | 1.0 | 1.0 | 1.0 |
| Particle Size Distr.: | | | | | | |
| >10μ | 0.1 | 0.1 | 8.3 | 8.3 | 6.6 | 1.2 |
| 5–10μ | 2.8 | 2.8 | 12.4 | 12.4 | 9.2 | 8.2 |
| 4–5μ | 1.5 | 1.5 | 4.5 | 4.5 | 4.2 | 4.2 |
| 3–4μ | 2.3 | 2.3 | 6.3 | 6.3 | 5.7 | 6.5 |
| 2–3μ | 3.4 | 3.4 | 8.6 | 8.6 | 8.9 | 9.4 |
| 1–2μ | 9.0 | 9.0 | 17.1 | 17.1 | 18.4 | 15.5 |
| 0.5–1μ | 19.0 | 19.0 | 17.2 | 17.2 | 16.2 | 16.0 |
| 0–0.5μ | 61.9 | 61.9 | 25.1 | 25.1 | 30.8 | 39.0 |
| >5μ | 2.9 | 2.9 | 20.7 | 20.7 | 15.8 | 9.4 |
| >2μ | 89.9 | 89.9 | 59.4 | 59.4 | 65.4 | 70.5 |
| pH (water) | 4.4–5.5 | 4.4–5.5 | 4.4–5.5 | 4.4–5.5 | 6.0–7.0 | 4.4–5.5 |

[1] A.F.—Air floated.   [2] W.F.—Water fractionated.

Representative "hard" and "soft" kaolinites contain (by weight): 44–46% silica; 37.5–39.5% alumina; 0.5–2.0 iron oxide; and 1–2% titanium dioxide. The ignition loss of these representative clays is 13.9–14.2% by weight.

Representative calcined clays exhibit the following properties:

| | | | |
|---|---|---|---|
| Specific Gravity | 2.55 | 2.68 | 2.68 |
| Max. percent Moisture | 0.5 | 0.5 | 0.5 |
| 325 Mesh Residue, percent | 0.5 | 0.5 | 0.5 |
| Particle Size Distr. (percent by weight): | | | |
| >2 | 38 | 50 | 70 |
| >5 | 31 | 8 | 5 |
| Ignition Loss, percent | <3 | <1 | <1 |
| pH (water) | 5.5–6.2 | 5.5–6.2 | 5.5–6.2 |

They contain (by weight): 54% silica; 43.75% alumina; 0.25% iron oxide; and 0.75% titanium dioxide.

Representative commercially available clays include: Champion Clay ("hard"), Crown Clay ("hard"), Harwick Clay #1 ("hard"), Suprex Clay ("hard"), Alumex R ("soft"), Hi-White R ("soft"), McNamee Clay ("soft"), Paragon Clay ("soft"), Polyfil F ("soft"), Iceberg Pigment (calcined), and Polyfil 70 (calcined).

Clays are more particularly described in the following publications: Compounding Ingredients for Rubber, Third edition, 1961, Cuneo Press of New England, Cambridge, Mass., compiled by the editors of Rubber World, 630 Third Avenue, New York 17, New York; Kaolin Clays and Their Industrial Uses, J. M. Huber Corp., New York, New York, Second edition, 1955; India Rubber World, vol. 118, No. 6, New York, September 1948, pages 793–795; Clays, Their Occurrence, Properties and Uses, H. Ries, Third edition, John Wiley & Sons, Inc., New York, 1927; The Chemistry and Physics of Clays and Other Ceramic Materials, A. B. Searle and R. W. Grimshaw, Third edition, Interscience Publishers, Inc., New York, 1959; Preliminary Reports Reference Clay Materials, American Petroleum Institute Research Project 49, Columbia University, New York, January 1951; and X-ray Identification and Crystal Structures of Clay Materials, Edited by G. W. Brindley, London, 1951.

Generally, 20–300 parts, 120–200 parts, of clay are employed for every 100 parts of copolymer. When smaller amounts of clay are employed, the vulcanizate properties are much less satisfactory. It is to be understood that after the heat-treatment has been carried out, the stock can be loaded with still greater amounts of clay for special purposes. It is generally unnecessary to employ more than 300 parts of clay per 100 parts of elastomer during the heat-treatment.

The elastomer, clay and promoter can be mixed at the temperautre selected for the heat treatment. However, it is difficult to achieve good dispersion of the clay filler in a reproducible manner at these high temperatures because the reduced elastomer viscosity lessens the shearing action needed for mixing the clay. Thus, it is preferred that the clay, at least, be added to the elastomer at temperatures below 150° F. The best procedure is to mix the three components on a cool rubber roll mill at temperatures between about 75° F. and 100° F. The promoter can be added on a hot mill by blending it rapidly to provide equal effect on the entire batch. When one heat treats in a Banbury, the elastomer, clay, and promoter (and optional additives such as stearic acid and petroleum oil) are added to the Banbury while it is hot; in this case, the mixing is very rapid and good dispersion is obtained before the batch temperature gets over 200–250° F.

As mentioned heretofore, in addition to the copolymer, clay and promoter, other components may be present provided they do not interefere with the heat treatment or the subsequent cure and provided they themselves do not initiate premature curing. A petroleum oil of the hereinafter-described type can be present and may facilitate processing if the copolymer is very tough and difficult to mill and masticate. A release agent such as stearic acid is suitable at concentrations such as one part per 100 parts by weight of copolymer.

The heat-treating is done by masticating a mixture comprising copolymer, clay, and promoter, preferably on a 2-roll mill or a Banbury mixer, for periods of time ranging from about 5 minutes to 30 minutes. The heating time is not particularly critical, although it is believed that a treatment less than 10 minutes long would give slightly less satisfactory results: there is generally no advantage in heat-treating for more than about 10 minutes.

The temperature can range from at least 275° F. (135° C) to at least 400° F. (204° C.) Between about 275° F. (135° C.) and 300° F. (148.9° C.) an increase in the temperature causes an increase in the effectiveness of the heat-treatment. Between 300° F. (148.9° C.) and 400° F. (204 C.), a plateau is reached and only a small degree of improvement at most is observed in raising the temperature from 300° F. (148.9° C.) to 350° F. (176.7° C.). Temperatures above 400° F. (204° C.), e.g. 500° F. (260° C.), can be employed, if desired, but are unnecessary.

After the heat-treatment has been completed, the curings agents are introduced. In order to avoid unmanageable scorch, it is preferred to cool the batch to 250° F., preferably 75–100° F. before they are introduced.

The elastomers which may be heat-treated according to the novel process of the present invention are the normally solid copolymers of ethylene, at least one alpha-monoolefin as defined heretofore and at least one non-conjugated hydrocarbon diene.

Representative examples of useful alpha-monoolefins having the structure R—CH=CH$_2$ include: propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

The representative dienes include dicyclopentadiene; an aliphatic diene having the structure

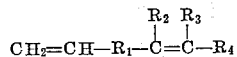

wherein R$_1$ is an alkylene radical, R$_2$ and R$_3$ are independently selected from the group consisting of hydrogen and alkyl radicals, and R$_4$ is an alkyl radical and wherein R$_1$ to R$_4$ are so selected that the diene has from about 6–22 carbon atoms; a 5-alkenyl-substituted-2-norbornene; 5-methylene-2-norbornene; and 2-alkyl-2-norbornadienes.

Representative examples of these copolymers are described in U.S. Patents 2,933,480 and 3,000,866. Also included are copolymers of ethylene, at least one alpha-monoolefin as described above and a 5-alkenyl-substituted-2-norbornene or 5-methylene-2-norbornene or a 2-alkyl-2,5-norbornadiene.

To obtain 5-methylene-2-norbornene, allene having the formula H$_2$C=C=CH$_2$ is heated in the absence of a polymerization initiator with cyclopentadiene. Preferably, the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2–24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of copolymers of ethylene, at least one alpha-monoolefin and 5-methylene-2-norbornene include Ethylene/propylene/5-methylene-2-norbornene;
Ethylene/1-butene/5-methylene-2-norbornene;
Ethylene/1-decene/5-methylene-2-norbornene;
Ethylene/5,5-dimethyl-1-octene/5-methylene-2-norbornene;
Ethylene/4-methyl-1-hexene/5-methylene-2-norbornene;
Ethylene/4,4-dimethyl-1-pentene/5-methylene-2-norbornene;
Ethylene/5,6,6-trimethyl-1-heptene/5-methylene-2-norbornene.

The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher propylene content are known to be leathery and boardy.

The 5-methylene-2-norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from (1) the methylene radical of 5-methylene-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

The 5-alkenyl-2-norbornenes may be described by the following formula

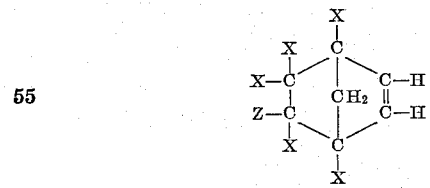

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

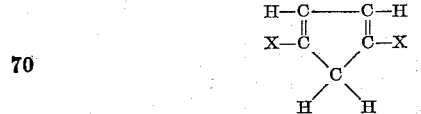

in which X is as heretofore described; the X's can be the same or different. The reaction is carried out at autogenous pressure in a closed inert (e.g. glass and stainless steel) container at temperatures ranging between about 150 to 250° C., preferably 175–225° C., for times ranging between about 2 to 24 hours. It is preferred that an addition polymerization inhibitor (e.g. hydroquinone) be present. Representative syntheses of this type are: the formation of 5-(2'-butenyl)-2-norbornene from cyclopentadiene and 1,4-hexadiene; the preparation of 5-(1'-propenyl)-2-norbornene from cyclopentadiene and 1,3-pentadiene (often called piperylene).

The reaction of cyclopentadiene with conjugated dienes having the structure X'—CH=CH—CH=CH—X", where X' and X" are alkyl radicals, can be used to prepare 6-alkyl-5-alkenyl-2-norbornenes having the structures

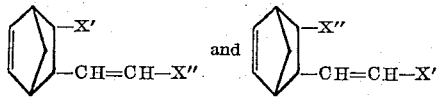

The reaction of cyclopentadiene with unsymmetrical non-conjugated dienes of the structure $$CH_2=CH-CH_2-CH=CH-Q$$

where Q is an alkyl radical will lead to 5-(2-alkenyl)-2-norbornenes

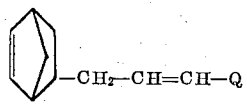

The reaction of cyclopentadiene with conjugated dienes of the formula $CH_2=CH-CH=CH-Q'$, where Q' is an alkyl radical, will produce

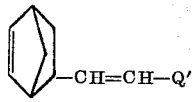

The 2-norbornenes having the structures

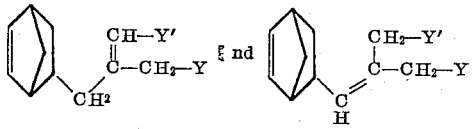

where Y is H or alkyl and Y' is alkyl, are made by reacting the Grignard reagent of 5-bromoethyl-2-norbornene in ether with ketones having the structure $$Y-CH_2-\overset{O}{\underset{\|}{C}}-CH_2-Y'$$

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of the heretofore described 2-norbornenes include:

5-(2'-ethyl-2'butenyl)-2-norbornene;
5-(2'-ethyl-1'-butenyl)-2-norbornene;
5-(2'methyl-1'-propenyl)-2-norbornene;
5-(2'-propyl-2'-pentenyl)-norbornene;
5-(2'-hexyl-2'-undecenyl)-2-norbornene;
5-(2'nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Representative examples of copolymers of ethylene, at least one alpha-monoolefin and a 5-alkenyl-2-norbornene include.

ethylene/propylene/5-(2'-butenyl)-2-norbornene;
ethylene/propylene/5-(2'-ethyl-2'-butenyl)-2-norbornene;
ethylene/propylene/5-(2'-ethyl-1'-butenyl)-2-norbornene;
ethylene/propylene/5-(1'-propenyl)-2-norbornene;
ethylene/1-butene/5-(2'-heptyl-1'-undecenyl)-2-norbornene;
Ethylene/1-butene/5-(2'-butenyl)-2-norbornene;
Ethylene/1-butene/5-(2'-ethyl-2'-butenyl)-2-norbornene;
Ethylene/4,4-dimethyl-1-hexene/5-(2'-propyl-2'-pentenyl)-2-norbornene;
Ethylene/5,5-dimethyl-1-octene/5-(2'-nonyl-2'-heptenyl)-2-norbornene;
Ethylene/6-methyl-1-heptene/5-(2'-methyl-2'-decenyl)-2-norbornene;
Ethylene/1-butene/5-(2'-hexyl-2'-butenyl)-2-norbornene; and
Ethylene/5,6,6-trimethyl-1-heptene/5-(2'-octyl-2'-butenyl)-2-norbornene.

The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher propylene content are known to be leathery and boardy.

The 5-alkenyl-2-norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from two sources (1) the alkenyl radical of the 5-alkenyl-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

Still another group of copolymers which may be prepared are copolymers of ethylene, at least one α-monoolefin as defined above and a 2 - alkyl-substituted-2,5-norbornadiene. Representative examples include:

Ethylene/propylene/2-methyl-2,5-norbornadiene;
Ethylene/propylene/2-ethyl-2,5-norbornadiene;
Ethylene/1-butene/2-methyl-2,5-norbornadiene;
Ethylene/1-hexene/2-ethyl-2,5-norbornadiene;
Ethylene/1-decene/2-butyl-2,5-norbornadiene; and
Ethylene/1-heptene/2-octyl-2,5-norbornadiene.

The 2-alkyl-2,5-norbornadienes can be described by the following structural formula

where R is a $C_1-C_8$ alkyl radical. These dienes are made by heating acetylenes having the formula $$R-C\equiv C-H$$

where R is a $C_1$–$C_8$ alkyl radical, with cyclopentadiene at 175–225° C. In the absence of a polymerization initiator. Closed reaction vessels made from stainless steel or glasslined steel are satisfactory.

The preparation of ethylene/alpha-monoolefin/open chain non-conjugated diene copolymers and ethylene/ alpha-monoolefin/dicyclopentadiene copolymers is described in U.S. Patents 2,933,480 and 3,000,866, respectively. The remaining copolymers can be made by contacting ethylene, at least 1-alpha-monoolefin as described, and at least one non-conjugated diene as described in solution in tetrachloroethylene with specific coordination catalysts as hereinafter described at temperatures between about −30° C. and 50° C. Coordination catalysts useful for preparing the copolymers in solution are made by mixing vanadium tetrachloride or vanadium oxytrichloride or vanadium tris(acetylacetonate) with a reducing compound having the structure $(R)_2AlX$ where R is $C_1$–$C_{12}$ alkyl (such as ethyl, isobutyl, octyl, or dodecyl) and X is a chlorine atom or bromine atom; the preferred organo aluminum compound is diisobutyl aluminum chloride. The relative proportions of the vanadium salt and the organo aluminum compound are frequently selected so that the molar ratio of Al:V is at least about 1.5:1. Those skilled in the art can determine the best proportion on to use with a particular set of catalyst components. Thus, when aluminum triisobutyl or diisobutyl aluminum chloride is employed with $VOCl_3$, Al:V is preferably in the range 1.5:1 and 2.5:1. Values above 2.5:1 (e.g. 10:1) can be used if desired. When vanadium tris(acetyl-acetonate) is employed, the preferred value of the Al:V molar ratio ranges from about 4:1 to 10:1. The preferred concentration of the vanadium salts in the reaction zone is about 0.005 to 0.0005 molar; however, higher or lower concentrations can be employed. The catalyst may be premixed or it may be formed in situ in the reaction zone.

The catalyst systems are used by contacting them with the above-described monomers at atmospheric, subatmospheric, or superatmospheric pressure. The coordination catalyst can be added before, during or after the introduction of the monomers. Oxygen, carbon monoxide, and compounds bearing Zerewithinoff-active hydrogen atoms (e.g. water vapor, alcohol) are absent.

Any material suitable for the reaction vessel can be used which is inert to the reaction mixture. Glass, glass enamel, or stainless steel are satisfactory. The reactor should be equipped with means for agitation.

In general, the copolymers are prepared at temperatures ranging from about −30° C. to about 50° C. At higher temperatures, the catalysts tend to be inconveniently short-lived. Furthermore, there is an increased tendency for interaction between the catalysts and the halogenated solvents. It is generally inconvenient to operate at temperatures below about −30° C. because additional cooling equipment is required; furthermore, at temperatures much below −30° C., the reaction rate is undesirably reduced and it is more difficult to prepare copolymers of suitable composition.

At the end of the reaction time, the catalyst is deactivated by addition of a conventional agent such as isopropyl alcohol. When vanadium catalyst is used, at least enough alcohol is supplied to provide 1 mole of hydroxyl groups for each atom of vanadium. After the reaction has been stopped, copolymers prepared in solution can be recovered by conventional methods such as evaporative distillation, drum drying, flash drying, and coagulation with a nonsolvent such as isopropyl alcohol. When the copolymer is obtained as a slurry or coagulum, it can be separated from a major portion of the reaction medium by conventional mechanical means, filtration or centrifugation being representative techniques. A nonvolatile antioxidant such as 2,2′-methylene bis(6-tert-butyl-4-methyl-phenol) is often incorporated prior to the final isolation step to avoid possible oxidation and degradation of the copolymer. In any event, the copolymer can be finally obtained by drying, as for example, in a vacuum oven or on a rubber roll mill.

These copolymers can be oil extended before they are heat treated and cured by the improved process of the present invention. Representative suitable copolymers have Mooney (ML–4) viscosities at 100° C. of at least 50, preferably higher, and inherent viscosities (0.1% by weight solution in tetrachloroethylene at 30° C.) of preferably 1.8 or above. The oils used are petroleum oils having a flash point of at least about 300 F. and a viscosity-gravity constant in the range from 0.80 to 1.0. A detailed view of the nature of petroleum oils is given in the article entitled "Hydrocarbon Composition of Rubber Processing Oils" by S. Kurtz, Jr. and C. C. Martin, India Rubber World, 126, No. 4, July 1952, page 495 et seq. The viscosity-gravity constant is described in the 1958 booklet "A Graphic Method for Selecting Oils Used in Compounding and Extending Butadiene-Styrene Rubbers" (Industrial Products Department, Sun Oil Company, Philadelphia, Pennsylvania, 1958). Representative oils include paraffinic oils, naphthenic, relatively aromatic, and aromatic oils having viscosity-gravity constants in the range 0.820–0.949. The particularly preferred oils are the paraffinic and naphthenic oils. The petroleum oil can be introduced into the copolymer anytime after the polymerization reaction is finished. The petroleum oil can be added to the solution, the resulting mixture obtained being pumped to a drum dryer to remove the solvent. Alternatively, the petroleum oil can be introduced at the nip of the drum dryer along with the polymer solution. If desired, petroleum oil can be introduced into the dried copolymer stock in a Banbury mixer or on a rubber roll mill. A good dispersion can readily be obtained by empirical experimentation by those skilled in the art.

The compositions of the present invention can be very readily cured with sulfur. Any of the procedures familiar to those skilled in the processing of natural rubber, butadiene/styrene (SBR) and butyl rubber are suitable. It is preferable to use a combination of sulfur, a metal oxide, and a vulcanization accelerator. In general, about 0.2 to 2 parts of sulfur are used per 100 parts by weight of copolymer; it is to be understood that larger or smaller concentrations may be used when deemed desirable. Zinc oxide and cadmium oxide are the preferred oxides; zinc oxide is particularly preferred because it is more efficient, lower in cost, and is less hazardous to use. The concentration of the metal oxide is important since it, in conjunction with sulfur and accelerator, controls the ultimate state of cure. At concentrations of 3 to 10 parts by weight per 100 parts by weight of elastomers, the rate and state of cure are very satisfactory as indicated by modulus, compression set, and elongation. Concentrations above 10 phr. are unnecessary. Concentrations below 3 phr. are less satisfactory for developing and maintaining adequate vulcanizate properties. The best accelerators for the vulcanization are also the preferred ones for curing natural rubber. The most active accelerators include 2-mercaptobenzothiazole, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate; the zinc salt of dimethyl dithiocarbamic acid; the piperidine salt of pentamethylene dithiocarbamic acid; 2-mercaptothiazoline; 2-mercaptothiazole; N,N-diethylthiocarbamyl-2-mercaptobenzothiazole; and 2,2'-dithiobis benzothiazole. Unlike natural rubber and SBR, the presence of a fatty acid is not necessary for the vulcanization of this copolymer. In fact, vulcanization is inhibited by the presence of relatively weak carboxylic acids if used in excessive amounts. At low concentrations (0.25–1.0 phr. by weight of copolymer), stearic acid is very useful as a release agent for heavily loaded stocks. Vulcanization is accomplished by heating the compounded stock (usually in a mold) at a temperature of about 130° C. to 180° C. for a period ranging from about ½ hour to several hours; it is often preferred to cure the stock at 135° C. for about 1.5 hours or at 160° C. for one hour. The state of cure is best determined by extension modulus at 300% elongation.

It is to be understood that various modifications of the sulfur curing procedure may be employed depending upon the stock. Various procedures and modifications of sulfur curing are more particularly described in Encyclopedia of Chemical Technology, Kirk and Othmer, published by Inter-Science Encyclopedia, Inc., New York, 1953, 11, pp. 892–927; Principles of High-Polymer Theory and Practice, Schmidt and Marlies, published by McGraw-Hill Book Co., N.Y., 1948, pp. 556–566; Chemistry and Technology of Rubber, Davis and Blake, published by Reinhold Publishing Corp., N.Y., 1937, Chapter 6; Introduction to Rubber Technology, edited by M. Morton, Reinhold Publishing Corp., N.Y., 1959, pages 93–129; The Applied Science of Rubber, edited by W. J. S. Naunton, Edward Arnold Ltd., London, 1961, pages 346–413, 922–1099.

Representative examples illustrating the invention follow.

*Example 1*

Four stocks 93, 94, 97 and 99 were compounded on a rubber roll mill at a temperature between 75° F. and 100° F. according to the following recipes:

|  | 93 | 94 | 99 | 97 |
|---|---|---|---|---|
| Hydrocarbon Copolymer | 100 | 100 | 100 | 100 |
| Stearic acid | 1 | 1 | 1 | 1 |
| Promoter A | 0 | 3 | 3 | 3 |
| Suprex clay | 120 | 120 | 0 | 120 |

Stocks 99 and 97 were then masticated on a hot 2-roll mill for 10 minutes at 350° F. and allowed to cool to 75–100° F. After Stock 99 had been mixed with 120 parts of Suprex clay, all the stocks were further compounded at 75–100° F. on the rubber roll mill with 20 parts of petroleum oil and the following curing aids:

Parts by weight
Zinc oxide _____ 5
2-Mercaptobenzothiazole _____ 0.5
Tetramethylthiuram monosulfide _____ 1.5
Sulfur _____ 1.5 and cured at 307° F. for 30 minutes. The following data were obtained:

VULCANIZATE PROPERTIES OF STOCKS

|  | Not Treated | | Heat Treated (350° F.) | |
|---|---|---|---|---|
|  | 93 | 94 | 99 [1] | 97 [2] |
| Promoter present | None | A | A | A |
| Mooney scorch at 250° F. 10 pt. rise, min | 9 | 15 | 15 | 22 |
| Tensile strength, lb./sq. in | 2,025 | 1,850 | 1,725 | 1,800 |
| 200% modulus, lb./sq. in | 360 | 500 | 450 | 700 |
| Yerzley resilience, percent | 60 | 62 | 60 | 68 |
| NBS abrasion index | 43 | 50 | 47 | 64 |
| Compression set, percent | 59 | 51 | 59 | 38 |

[1] Clay added after heat treatment.
[2] Clay added before heat treatment.

The preceding data shows that optimum results are obtained when the filler, polymer, and promoter are present during the heat-treatment. Heat-treatment without clay being present causes a deterioration in the properties of the vulcanizate as evidenced when comparing Stocks 94 and 99.

The hydrocarbon copolymer employed, made in accordance with the procedures of U.S. Patent 2,933,480, had the following characteristics:

Weight, percent
Ethylene monomer units _____ 56
Propylene monomer units _____ 40
1,4-Hexadiene monomer units _____ 4
Mooney viscosity (ML4/100° C.): 90.
Inherent viscosity (0.1% by weight solution in tetrachloroethylene at 30° C.): 2.7.

Suprex clay was an air-floated "hard" kaolin clay (commercially available from the J. M. Huber Corp., N.Y.) containing 44–46% silica, 37.5–39.5% alumina, 1.5–2.0% iron oxide, and 1–2% titanium dioxide by weight, the ignition loss being 13.9–14.2% by weight. The maximum moisture content was 1.0% by weight. The pH (in water) was 4.5–5.5. This clay had a specific gravity of 2.60, a 325-mesh screen residue of 0.17% by weight, and the following particle size distribution (by weight): >10µ, 0.1%; 5–10µ, 2.8%; 4–5µ, 1.5%; 3–4µ, 2.3%; 2–3µ, 3.4%; 1–2µ, 9.0%; 0.5–1µ, 19.0%; 0–0.5µ, 61.9%.

Promoter A was a chlorosulfonated polyethylene made in accordance with procedures described in U.S. Patent 2,586,363, containing 1.5 percent sulfur by weight and 30 percent chlorine by weight; the polyethylene before chlorosulfonation had a density of 0.912 and a melt index of 10.

The relatively paraffinic petroleum oil ("Necton" 60 commercially available from Humble Oil & Refining Co.) had the following characteristics:

Flash Point _____ ° F__ 445
Viscosity-gravity constant _____ 0.8980
Percent paraffin chain carbons _____ 55
Percent naphthenic chain carbons _____ 45
Percent aromatic chain carbons _____ 0
Specific gravity at 60° F. _____ 0.8996
Viscosity, S.S.U. at 210° F., seconds _____ 58
Rostler[1] values:
    Percent N-bases _____ 0
    Percent 1st acidaffins _____ 1.5
    Percent 2nd acidaffins _____ 28.3
    Percent paraffins _____ 70.2

[1] Industrial and Engineering Chemistry, vol. 41, pages 598–608, March 1949.

*Example 2*

The copolymer, promoter, and petroleum oil of Example 1 were used.

Two stocks were compounded on a cool rubber roll mill at a temperature between 75 and 100° F. according to the following recipes:

|  | 5703A | Control 113 |
|---|---|---|
|  | 114 |  |
| Copolymer | 100 | 100 |
| Stearic Acid | 1 | 1 |
| Promoter A | 1 | 0 |
| Suprex clay | 120 | 120 |

After these compositions had been masticated on a rubber roll mill for 10 minutes at 300° F., they were mixed on a rubber roll mill at a temperature between 75 and 100° F. with petroleum oil and curing aids as described in Example 1. The resulting stocks were cured for 30 minutes at 307° F. to give vulcanizates exhibiting the following characteristics:

VULCANIZATE PROPERTIES OF STOCKS HEAT TREATED AT 300° F.

| 5703A | 114 | 113 |
|---|---|---|
| Promoter present | A | None |
| Mooney scorch at 250° F. 10 point rise, min | 20 | 20 |
| 200% modulus, lb./sq. in | 475 | 425 |
| Tensile strength, lb./sq. in | 2,150 | 1,950 |
| Elongation, percent | 760 | 750 |
| Yerzley resilience, percent | 68 | 65 |
| NBS abrasion index | 58 | 58 |
| Compression set, percent | 39 | 49 |

Example 3

Five stocks were compounded on a cool rubber roll mill at a temperature between 75 and 100° F., each stock containing (parts by weight): ethylene/propylene/1,4-hexadiene copolymer, 100 parts; stearic acid, 1 part; the petroleum oil of Example 1, 20; and Suprex clay, 120 parts. To each of these compositions was added a promoter as follows:

| 5703A | 130 | 131 | 132 | 133 | 134 |
|---|---|---|---|---|---|
| Promoter A | 3 | 2 | 3 | 5 | 0 |
| Promoter B | 0 | 0 | 0 | 0 | 3 |

These stock were subsequently masticated on a rubber roll mill for 10 minutes at the temperatures given in the table below.

The heat-treated stocks were then further compounded with curing aids on a cool rubber roll mill at a temperature between 75° and 100° F. according to the recipe given in Example 1 above. The resulting compositions were cured for 30 minutes at 307° F. to give vulcanizates displaying the following properties:

VULCANIZATE PROPERTIES OF HEAT TREATED STOCKS

| 5703A | 130 | 131 | 132 | 133 | 134 |
|---|---|---|---|---|---|
| Promoter present | A | A | A | A | B |
| Heat Treatment Temp. (° F.) | 275 | 300 | 300 | 300 | 300 |
| Mooney scorch at 250° F. 10 point rise, min | 16 | 16 | 16 | 17 | 18 |
| 200% modulus, lb./sq. in | 500 | 500 | 510 | 600 | 590 |
| 500% modulus, lb./sq. in | 700 | 650 | 700 | 810 | 775 |
| Yerzley resilience, percent | 65 | 65 | 66 | 67 | 68 |
| NBS abrasion index | 59 | 49 | 54 | 51 | 49 |
| Compression set, percent | 34 | 39 | 34 | 27 | 31 |

These data demonstrate that heat-treatment (Stock 130) at 275° F. is only slightly less effective than (Stock 132) at 300° F.; increasing the concentration of Promoter A in increments from 2 to 5 parts (Stocks 131–133) produces improvement in physical properties; Promoters A and B are similar in effectiveness (Stocks 132 and 134) respectively.

The ethylene/propylene/1,4-hexadiene copolymer employed, made in accordance with procedures described in U.S. Patent 2,933,480, had the following characteristics:

Weight percent ethylene monomer units _____ 53.4
Weight percent propylene monomer units _____ 43
Weight percent 1,4-hexadiene monomer units _____ 3.6
Mooney viscosity (ML-4/100° C.) _____ 92
Inherent viscosity _____ 2.7

Promoter B was a chlorosulfonated polyethylene made in accordance with procedures described in U.S. Patent 2,586,363, containing 1.6 percent sulfur by weight and 44 percent chlorine by weight; the polyethylene before chlorosulfonation had a density of 0.922 and a melt index of 100.

Example 4

Five stocks were prepared (157–161) at a temperature between 75 and 100° F., each containing 100 parts by weight of the copolymer of Example 3, 1 part of stearic acid, 120 parts of Suprex clay, and 20 parts of the petroleum oil of Example 1. Stock 158 contained 2 parts of Promoter A; Stocks 159–161 contained 3 parts of Promoters C, D, and E, respectively. After these stocks had been masticated on a hot rubber roll mill for 10 minutes at 310° F., they were subsequently compounded on a cool roll mill at a temperature between 75 and 100° F. with the curing aids described in Example 1 above. The resulting compositions were cured for 30 minutes at 307° F. to give vulcanizates displaying the following properties:

VULCANIZATE PROPERTIES OF STOCKS HEAT TREATED AT 310° F.

| 5703A | 157 | 158 | 159 | 160 | 161 |
|---|---|---|---|---|---|
| Promoter present | None | A | C | D | E |
| Mooney scorch at 250° F. 10 point rise, min | 13 | 19 | 17 | 19 | 19 |
| 200% modulus, lb./sq. in | 490 | 550 | 550 | 600 | 500 |
| 500% modulus, lb./sq. in | 875 | 1,000 | 1,050 | 1,100 | 775 |
| Yerzley resilience, percent | 66 | 68 | 68 | 67 | 67 |
| NBS abrasion index | 59 | 56 | 61 | 61 | 55 |
| Compression set, percent | 49 | 35 | 32 | 29 | 37 |

Promoter C was a chlorosulfonated polyethylene, made in accordance with the procedures of U.S. Patents 2,586,363 and 2,862,917, and containing 0.97% sulfur and 35.4% chlorine and having a specific gravity of 1.18. The polyethylene before chlorosulfonation had a density of 0.96 and a melt index of about 0.5.

Promoter E was a liquid chlorinated paraffin prepared in accordance with the procedure described in U.S. Patent 2,571,901, having 40% chlorine by weight and a pour point of −20° C. The viscosity at 25° C. was 250–280 centipoises.

Promoter D was a chlorinated polyethylene prepared according to the procedure described in U.S. Patent 2,571,901, containing 46% by weight chlorine. The polyethylene prior to chlorination had a density of 0.92 and a melt index of 100.

Example 5

Two stocks (116 and 120) were compounded on a cool rubber roll mill at a temperature between 75 and 100° F., each stock containing: ethylene/propylene/1,4-hexadiene copolymer of Example 1, 100 parts; stearic acid, 1 part; Suprex clay, 200 parts; petroleum oil, 20 parts. Stock 120 contained, in addition, 3 parts of Promoter A. After the stocks have been masticated for 10 minutes on a rubber roll mill at 300° F., they were further compounded on a cool rubber roll mill at a temperature between 75 and 100° F. with the curing aids disclosed in Example 1 above. The resulting stocks, cured for 15 minutes at 324° F., gave vulcanizates displaying the following properties:

VULCANIZATE PROPERTIES OF STOCKS HEAT TREATED AT 300° F.

| 5703A | 116 | 120 |
|---|---|---|
| Promoter present | None | A |
| Mooney scorch at 250° F. 10 point rise, min | 8 | 22 |
| 200% modulus, lb./sq. in | 410 | 800 |
| Yerzley resilience, percent | 43 | 48 |
| NBS abrasion index | 33 | 42 |
| Compression set, percent | 56 | 52 |

The relatively aromatic petroleum oil ("Sundex 53," commercially available from the Sun Oil Co.) had the following characteristics:

| | |
|---|---|
| Flashpoint, degrees F. | 380 |
| Viscosity-gravity constant | 0.936 |
| Percent paraffin chain carbons | 34 |
| Percent naphthenic chain carbons | 29 |
| Percent aromatic chain carbons | 37 |
| Specific gravity at 60° F. | 0.9874 |
| Viscosity, S.S.U. at 210° F., seconds | 83.1 |
| Rostler [1] values: | |
| Percent N bases | 13.5 |
| Percent 1st acidaffins | 32.4 |

[1] Industrial and Engineering Chemistry, vol. 41, pages 598–608 (March 1949).

The properties of the stocks in the preceding examples were determined at 25° C. according to the following procedures:

| | ASTM test method |
|---|---|
| Mooney scorch | D1077–55 T. |
| Stress-strain | D412–51 T. |
| Yerzley resilience | D945–55. |
| Compression set (22 hr. 70° C.) | D395–55 (Method B). |
| NBS abrasion index | D1630. |

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for heat-treating a normally solid ethylene/$CH_2$=CH-($C_{1-16}$alkyl)/nonconjugated hydrocarbon diene copolymer before curing, which process comprises masticating at 275–500° F. a mixture comprising 100 parts of said copolymer, 20–300 parts of clay, and 1–5 parts of a promoter compound having at least 6% chemically incorporated chlorine by weight, said promoter compound being selected from the class consisting of chlorinated saturated aliphatic hydrocarbon copolymers, sulfochlorinated saturated aliphatic hydrocarbon polymers, and mixtures of said polymers.

2. A process according to claim 1 wherein said copolymer is an ethylene/propylene/1,4-hexadiene copolymer, said promoter compound having at least 30% chemically incorporated chlorine by weight.

3. A process for heat-treating a normally solid ethylene/$CH_2$=CH-($C_{1-16}$ alkyl)/nonconjugated hydrocarbon diene copolymer before curing, which process comprises masticating at 300–400° F. for about 5–30 minutes a mixture comprising 100 parts of said copolymer, 120–200 parts of clay, and 1–5 parts of a sulfochlorinated polyethylene having chemically incorporated therein about 30–48% chlorine and about 0.9–1.6% sulfur, by weight.

4. A process according to claim 3 wherein said copolymer is an ethylene/propylene/1,4-hexadiene copolymer having an iodine number of from 5–60.

References Cited by the Examiner

UNITED STATES PATENTS

| | | | |
|---|---|---|---|
| 2,894,926 | 7/1959 | Jacobson | 260—41.5 |
| 2,933,480 | 4/1960 | Gresham et al. | 260—80.5 |

MORRIS LIEBMAN, *Primary Examiner.*

LESLIE H. GASTON, *Examiner.*

K. B. CLARKE, J. H. DERRINGTON,
*Assistant Examiners.*